(12) United States Patent
Liu et al.

(10) Patent No.: US 11,491,818 B2
(45) Date of Patent: Nov. 8, 2022

(54) HIGH-PRECISION WHEEL ASSEMBLING DEVICE

(71) Applicant: CITIC Dicastal Co., Ltd., Qinhuangdao (CN)

(72) Inventors: Weidong Liu, Qinhuangdao (CN); Shiwen Xu, Qinhuangdao (CN); Minglei Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 602 days.

(21) Appl. No.: 16/705,134

(22) Filed: Dec. 5, 2019

(65) Prior Publication Data

US 2020/0406678 A1  Dec. 31, 2020

(30) Foreign Application Priority Data

Jun. 27, 2019  (CN) .......................... 201910565516.3

(51) Int. Cl.
*B60B 31/04* (2006.01)
*B60C 25/138* (2006.01)
*B60C 25/05* (2006.01)

(52) U.S. Cl.
CPC .......... *B60B 31/04* (2013.01); *B60B 2380/10* (2013.01); *B60C 25/0542* (2013.01); *B60C 25/0545* (2013.01); *B60C 25/138* (2013.01)

(58) Field of Classification Search
CPC . B60B 31/04; B60B 2380/10; B60C 25/0542; B60C 25/0545; B60C 25/138
See application file for complete search history.

(56) References Cited

U.S. PATENT DOCUMENTS

| | | | |
|---|---|---|---|
| 6,240,995 B1 * | 6/2001 | Corghi | B60C 25/138 157/14 |
| 6,516,855 B2 * | 2/2003 | Corghi | B60C 25/0545 157/1.1 |
| 10,286,508 B2 * | 5/2019 | Zhao | B23Q 1/009 |
| 2013/0025797 A1 * | 1/2013 | Bonacini | G01M 1/045 157/14 |
| 2013/0192768 A1 * | 8/2013 | Peng | B60C 25/0542 157/1.22 |

\* cited by examiner

*Primary Examiner* — David B. Thomas
(74) *Attorney, Agent, or Firm* — IPro, PLLC

(57) ABSTRACT

The disclosure discloses a high-precision wheel assembling device, which is high in size and shape precision, good in dynamic balance, high in fatigue strength, good in rigidity and elasticity, light in weight, attractive in appearance and recyclable in material.

7 Claims, 2 Drawing Sheets

HIGH-PRECISION WHEEL ASSEMBLING DEVICE

FIELD

The disclosure relates to the technical field of wheels, in particular to a high-precision wheel assembling device.

BACKGROUND

Composite wheels are now becoming increasingly popular with young consumers. As an important safety component in an automobile, various performance indexes of wheels are important factors that restrict the development of composite wheels. Among them, the run-out value is a 100% inspection item of wheels. How to ensure that the overall run-out value is qualified after the composite wheels are assembled is a difficult problem which needs to be solved by wheel manufacturers.

SUMMARY

In view of the above, the present disclosure aims to provide a high-precision wheel assembling device, which has the characteristics of good wheel assembling precision, simple structure, convenient manufacture, and stable performance.

In order to achieve the above object, the technical solution of the present disclosure is realized as follows:

A high-precision wheel assembling device comprises a frame, a hollow base is fixed on the frame, a shaft sleeve is rotatably connected in the base, a flange plate is fixed on the shaft sleeve, an oil cylinder is fixed at the central part of the flange plate, a pull rod is vertically and upwards fixed at the output end of the oil cylinder, a wedge-shaped expanding core is fixed at the top of the pull rod, an expanding sleeve matched with the expanding core is fixed on the flange plate, the expanding core is driven by the pull rod to expand the expanding sleeve, and the expanding sleeve is sleeved on a flange outside the expanding sleeve.

In one embodiment, at least one bearing is arranged between the base and the shaft sleeve, the outer ring of the bearing is in interference fit with the inner side of the base, and the inner ring of the bearing is in interference fit with the shaft sleeve.

In one embodiment, two bearings are arranged between the base and the shaft sleeve, and a spacer ring is arranged between the two bearings.

In one embodiment, the lower part of the base is provided with an inward protrusion, the shaft sleeve is provided with an outward protrusion, and the two bearings are respectively abutted against the outward protrusion of the shaft sleeve and the inward protrusion of the base.

In one embodiment, a base plate is fixed to the frame, and the base is fixed to the base plate.

In one embodiment, the flange is further provided with a positioning ring at the periphery of the expanding core, and the coaxiality of the positioning ring and the expanding core is less than .mm.

In one embodiment, the outer diameter of the expanding core is an inverted cone structure, the inner wall of the expanding core is a regular cone structure, and the outer diameter inverted cone surface and the inner wall regular cone surface of the expanding core are respectively matched with the upper end regular cone surface of the expanding sleeve and the upper end part inverted cone structure of the flange.

Compared with the prior art, the high-precision wheel assembling device according to the present disclosure has the following advantages that:

The high-precision wheel assembling device according to the present disclosure can meet the requirement of high-precision wheel assembling, and has the characteristics of simple structure, convenience in manufacturing and stable performance.

BRIEF DESCRIPTION OF THE DRAWINGS

The accompanying drawings forming a part of the present disclosure are used to provide a further understanding of the present disclosure, and the schematic embodiments and the descriptions of the present disclosure serve to explain the present disclosure and do not constitute an improper limitation of the present disclosure. In the drawings.

Figure 1:
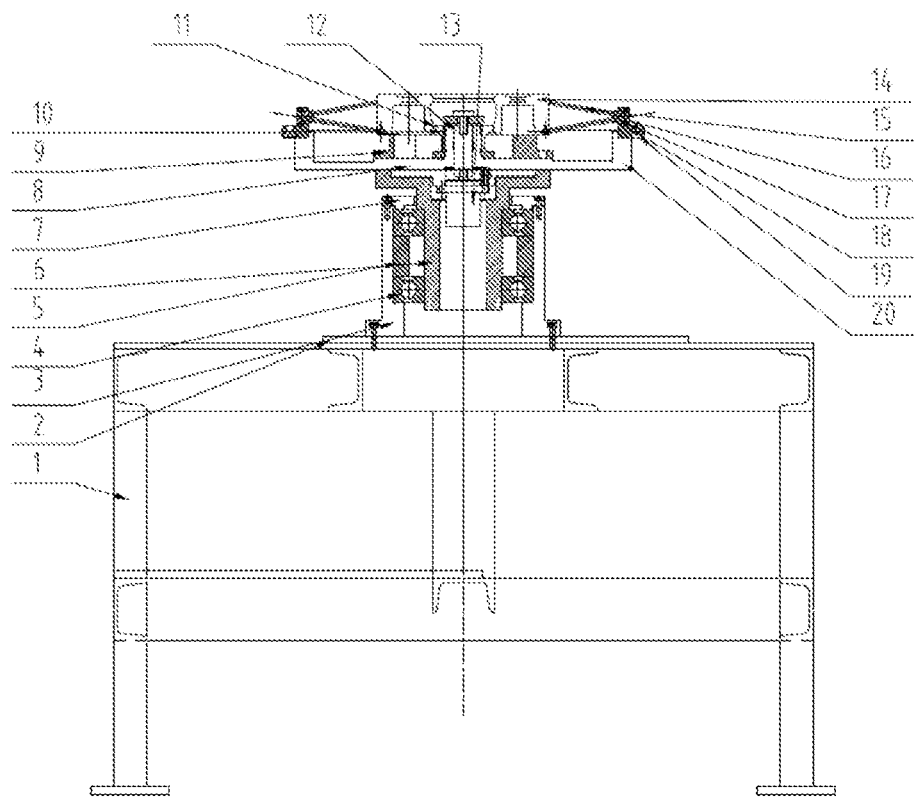
FIG. 1 is a schematic structural view of the high-precision wheel assembling device of the present disclosure.

DESCRIPTION OF THE REFERENCE NUMERALS frame, 2—base plate, 3—base, 4—bearing, 5—spacer ring, 6—shaft sleeve, 7—bearing end cover, 8—flange plate, 9—flange, 10—expanding core, 11—expanding sleeve, 12—pull rod, 13—oil cylinder, 14—flange, 15—titanium alloy spoke, 16—locking sleeve, 17—steel sleeve, 18—connecting ring, 19—bolt, 20—positioning ring

DETAILED DESCRIPTION OF THE DISCLOSURE EMBODIMENTS

It should be noted that the embodiments and the features in the embodiments of the present disclosure may be combined with each other without conflict.

The technical solution of the present disclosure will be described more clearly and completely with reference to the accompanying drawings in conjunction with the embodiments, and it is apparent that the described embodiments are only some but not all embodiments of the present disclosure. All other embodiments which can be obtained by a person with ordinary skill in the art without making any creative work based on the embodiments of the present disclosure belong to the claimed scope of the present disclosure.

Figure 2:
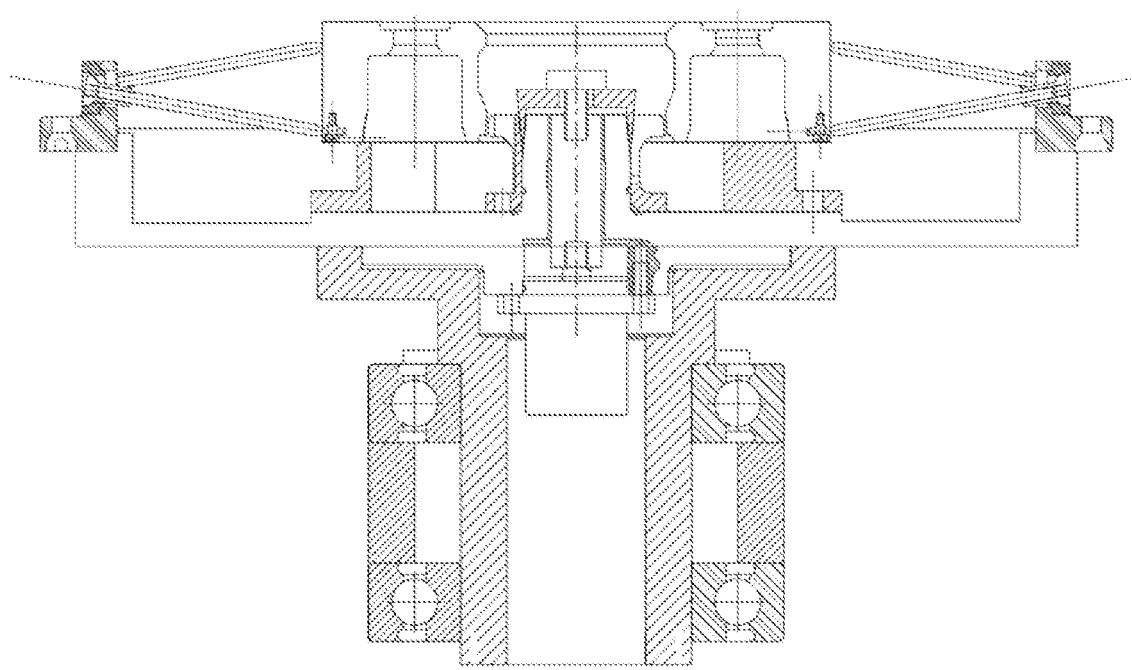
FIG. 2 is a schematic structural view of the high-precision wheel assembling device of the present disclosure.
Figure 3:
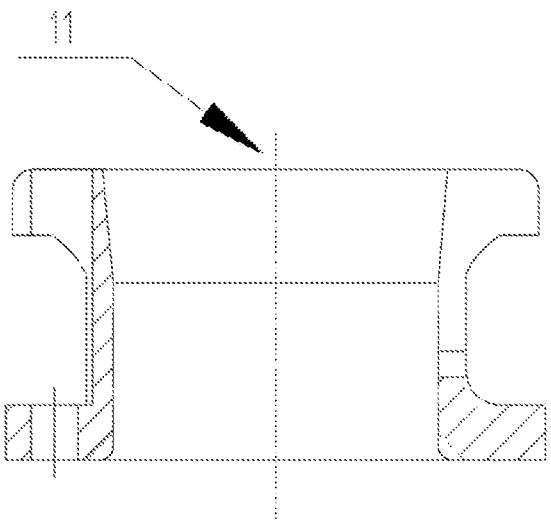
FIG. 3 is a schematic structural view of the expanding sleeve of the high-precision wheel assembling device of the present disclosure.
Figure 4:
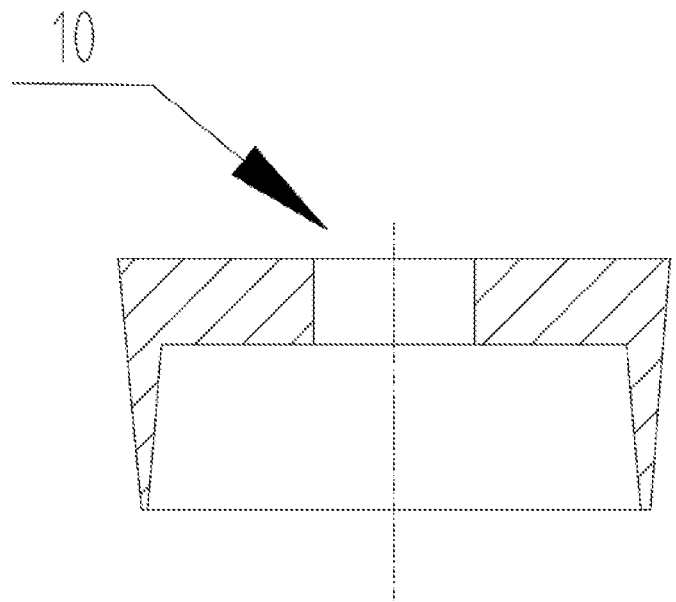
FIG. 4 is a schematic structural view of the expanding core for the high-precision wheel assembly device of the present disclosure.

A high-precision wheel assembling device according to an embodiment of the present disclosure will be described with reference to FIGS. 1 to 3 in conjunction with the embodiment.

A high-precision wheel assembling device comprises a frame 1, a hollow base 3 is fixed on the frame 1, a shaft sleeve 6 is rotatably connected in the base 3, a flange plate 8 is fixed on the shaft sleeve 6, an oil cylinder 13 is fixed at the central part of the flange plate 8, a pull rod 12 is vertically and upwards fixed at the output end of the oil cylinder 13, a wedge-shaped expanding core 10 is fixed at the top of the pull rod 13, an expanding sleeve 11 matched with the expanding core 10 is fixed on the flange plate 8, the expanding core 10 is driven by the pull rod 13 to expand the expanding sleeve 11, and the expanding sleeve 11 is sleeved on a flange 14 outside the expanding sleeve 11.

In one embodiment, at least one bearing 4 is arranged between the base 3 and the shaft sleeve 6, the outer ring of the bearing 4 is in interference fit with the inner side of the base 3, and the inner ring of the bearing 4 is in interference fit with the shaft sleeve 6.

In one embodiment, two bearings 4 are arranged between the base 3 and the shaft sleeve 6, a spacer ring 5 is arranged between the two bearings 4, and a bearing end cover 7 seals the two bearings 4 and the spacer ring 5 on the base 3.

In one embodiment, the lower part of the base 3 is provided with an inward protrusion, the shaft sleeve 6 is provided with an outward protrusion, and the two bearings 4 are respectively abutted against the outward protrusion of the shaft sleeve 6 and the inward protrusion of the base 3.

In one embodiment, a base plate 2 is fixed to the frame 1, and the base 3 is fixed to the base plate 2.

In one embodiment, the flange 8 is further provided with a positioning ring 20 at the periphery of the expanding core 10, and the coaxiality of the positioning ring 20 and the expanding core 10 is less than 0.05 mm, wherein this position tolerance is a key factor for ensuring the coaxiality precision of the flange 14 and the positioning ring 20 after the wheel is assembled and is also a key factor for ensuring the qualified wheel runout.

In one embodiment, the outer diameter of the expanding core 10 is an inverted cone structure, the inner wall of the expanding core 10 is a regular cone structure, and the outer diameter inverted cone surface and the inner wall regular cone surface of the expanding core 10 are respectively matched with the upper end regular cone surface of the expanding sleeve 11 and the upper end part inverted cone structure of the flange 8.

The oil cylinder 13 pulls the expanding core 10 downwards, through the conical surface matching among the expanding core 10, the expanding sleeve 11 and the flange 8, the outer diameter of the expanding sleeve 11 is expanded, the flange 14 is tightened, and the high-precision radial positioning of the flange 14 is realized. Then, the oil cylinder 13 contracts and drives the expanding core 10 to move upward. Under the action of its own elastic stress, the expanding sleeve 11 is separated from the central hole of the flange 14, so that the assembled wheel can be taken off. Here, the assembly of the wheel is finished.

Compared with the prior art, the high-precision wheel assembling device has the following advantages that:

the high-precision wheel assembling device according to the present disclosure is high in size and shape precision, good in dynamic balance, high in fatigue strength, good in rigidity and elasticity, light in weight, attractive in appearance and recyclable in material.

The invention claimed is:

1. A high-precision wheel assembling device, comprising a frame, wherein a hollow base is fixed on the frame, a shaft sleeve is rotatably connected in the base, a flange plate is fixed on the shaft sleeve, an oil cylinder is fixed at the central part of the flange plate, a pull rod is vertically and upwards fixed at the output end of the oil cylinder, a wedge-shaped expanding core is fixed at the top of the pull rod, an expanding sleeve matched with the expanding core is fixed on the flange plate, the expanding core is driven by the pull rod to expand the expanding sleeve, and the expanding sleeve is tightly sleeved on a flange outside the expanding sleeve.

2. The high-precision wheel assembling device according to claim 1, wherein at least one bearing is arranged between the base and the shaft sleeve, the outer ring of the bearing is in interference fit with the inner side of the base, and the inner ring of the bearing is in interference fit with the shaft sleeve.

3. The high-precision wheel assembling device according to claim 2, wherein two bearings are arranged between the base and the shaft sleeve, and a spacer ring is arranged between the two bearings.

4. The high-precision wheel assembling device according to claim 3, wherein the lower part of the base is provided with an inward protrusion, the shaft sleeve is provided with an outward protrusion, and the two bearings are respectively abutted against the outward protrusion of the shaft sleeve and the inward protrusion of the base.

5. The high-precision wheel assembling device according to claim 4, wherein a base plate is fixed on the frame, and the base is fixed on the base plate.

6. The high-precision wheel assembling device according to claim 5, wherein the flange plate is further provided with a positioning ring at the periphery of the expanding core, and the coaxiality of the positioning ring and the expanding core is smaller than 0.05 mm.

7. The high-precision wheel assembling device according to claim 5, wherein the outer diameter of the expanding core is an inverted cone structure, the inner wall of the expanding core is a regular cone structure, and an outer diameter inverted cone surface and an inner wall regular cone surface of the expanding core are respectively matched with the upper end regular cone surface of the expanding sleeve and the upper end part inverted cone structure of the flange plate.

\* \* \* \* \*